Oct. 4, 1932. H. E. EVANS ET AL 1,881,269
VALVE
Filed July 30, 1931
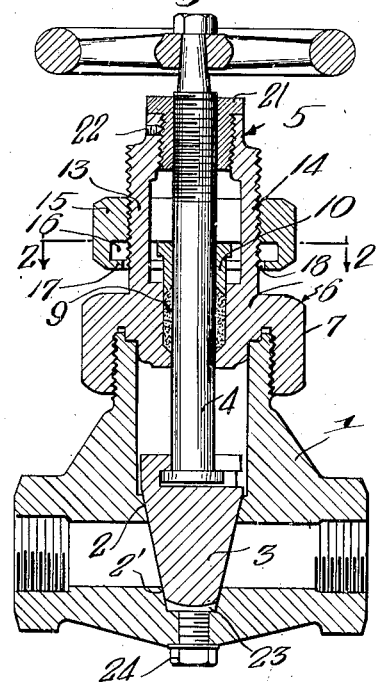
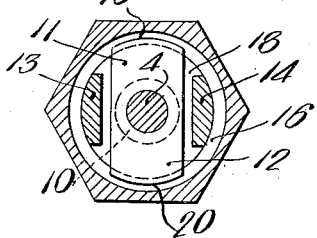
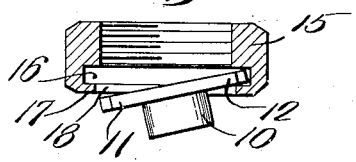
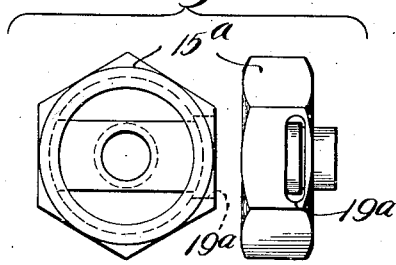
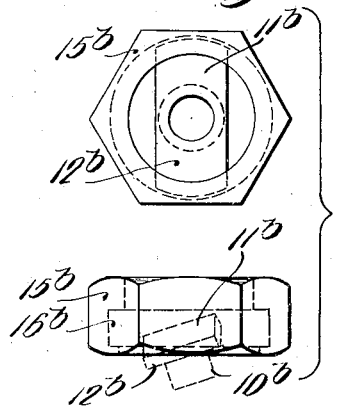
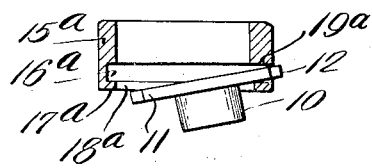
Inventors
Harrison E. Evans
Chauncey D. Allen
by Roberts, Cushman & Woodbury
their Attorneys Patented Oct. 4, 1932

1,881,269

UNITED STATES PATENT OFFICE

HARRISON E. EVANS, OF BELMONT, MASSACHUSETTS, AND CHAUNCEY D. ALLEN, OF PHILADELPHIA, PENNSYLVANIA, ASSIGNORS TO CONSOLIDATED ASHCROFT HANCOCK COMPANY, OF NEW YORK, N. Y., A CORPORATION OF DELAWARE

VALVE

Application filed July 30, 1931. Serial No. 553,928.

This invention pertains to valves of the type employed particularly for controlling high pressure fluids, for example, steam, and which comprise a stationary valve seat and a valve head which is moved toward and from the seat by means of a stem member commonly arranged to rotate as well as to move axially. Such a valve, having a substantially conical valve head or plug, attached to the valve stem by a swivel connection so that it need not partake of the rotary movement of the stem, is disclosed in the patent to Williston, No. 1,499,433, dated July 1, 1924. In valves of this type, it is necessary to employ packing material to prevent leakage of fluid longitudinally of the valve stem, such packing usually being disposed in an annular pocket concentric with the stem and being held under compression therein by means of an adjustable gland. The patent to Belvin T. Williston, No. 1,573,108, dated February 16, 1926, discloses a valve of this general type including means by which the gland may be controlled positively, both for advancing and retracting it, and the present invention constitutes an improvement upon the construction disclosed in said patent.

Valves of this character are often used in places which are difficult of access, and the valves themselves are frequently very hot or in proximity to other heated parts, and since the gland must be adjusted from time to time or removed for replacement of the packing, and since the packing material is sometimes of a character which may be injured by heat, it is desirable not only that the gland adjusting means be easily accessible for the application of adjusting tools and that the gland be retractable to permit replacement of the packing by the same means employed for advancing it to apply pressure, but also that the gland be exposed as much as possible to the open air so as to radiate heat and prevent overheating of the packing.

In the device of the aforesaid Williston patent, some of these desirable characteristics are obtained in part at least, but at the expense of serious complication of parts, and the primary object of the present invention is to provide a valve in which the desirable results above noted are attained to a high degree by the use of few, simple, and inexpensive parts which permit very ready assemblage of the valve members, and great ease of adjustment, as well as the rapid radiation of heat from the gland.

Another object of the invention is to provide a valve of the plug gate type which includes a one-piece bonnet and bonnet nut and a removable stem receiving sleeve.

In the accompanying drawing in which certain specific embodiments of the invention are illustrated by way of example:

Fig. 1 is a central vertical section showing the assembled valve with the valve head engaging its seat, and with the packing and gland in place;

Fig. 2 is a transverse section on the line 2—2 of Fig. 1;

Fig. 3 is a diametric vertical section through the gland adjusting nut, illustrating one step in the process of assembling the gland with the nut;

Fig. 4 is a composite plan and side elevation of a nut of a modified type, showing the gland assembled therewith;

Fig. 5 is a diametric section through the nut of Fig. 4, showing the method of assembling the gland therewith; and Fig. 6 is a composite view showing a further modified form of nut, in plan and side elevation, diagrammatically illustrating the mode of assembling the gland with the nut.

Referring to Fig. 1, the numeral 1 designates the valve body or casing which is provided with usual inlet and outlet openings and with the valve seats 2, 2' with which cooperate the conical plug gate valve head 3. This valve head is swiveled to the stem 4 which, as here shown, is screw threaded at its upper part for engagement with a screw-threaded sleeve fixed in the upper end 5 of the valve bonnet, it being understood that any other desired and usual arrangement may be employed for imparting longitudinal movement to the valve stem. The lower end 6 of the bonnet which fits into or against the upper part of the valve body 1 includes an internally screw-threaded integral ring 7 which surrounds and engages the body 1. It is to be understood that the valve bonnet may be integral with the main body 1 of the valve, if desired.

The lower end 6 of the bonnet is provided with a recess or pocket concentric with the valve stem and adapted to receive packing material 9 of any desired and usual character. This packing material is compressed within the pocket by means of a gland 10 having a tubular cylindrical part which telescopes over the valve stem, and having at its upper end oppositely extending ears 11 and 12.

The valve bonnet comprises oppositely disposed connecting arms or posts 13 and 14 uniting the upper and lower ends 5 and 6 of the bonnet, these connecting members being screw threaded on their outer surfaces for the reception of the gland adjusting nut 15. This nut is provided with an internal circumferential recess or groove 16 whose lower wall is defined by an annular flange 17 having a central opening 18, it being noted that this opening is preferably of such diameter that the inner edge of the flange does not engage the threaded portions of the parts 13 and 14. The recess or groove 16 receives the ends of the ears 11 and 12 when the parts are in assembled relation, the length of the ears being such that the distance between their outer edges 19 and 20 is somewhat less than the maximum diameter of the groove 16, but is substantially greater than the diameter of the opening 18 in flange 17. The upper end 5 of the bonnet is annular and receives the sleeve 21 which, as previously pointed out, has a screw-threaded engagement with the stem 4. The sleeve may be secured in the end 5 in any suitable manner, being here shown as threaded thereinto and fixed by a set screw 22. The lower valve seat 2' is formed by the walls of a conical cavity having a cylindrical extension below the seat to form a clean-out passage 23 normally closed by a removable plug 24, such clean-out passage being highly desirable in a valve of this type wherein the valve head has little if any rotary movement and thus tends to pack sediment solidly in the lower seat cavity.

One novel feature of this invention resides in the assembly of the gland with the other valve parts, which will now be described, it being assumed that the bonnet has been separated from the valve body and the stem, but that the nut 15 is in engagement with the upper parts of members 13 and 14. The gland 10 may now be inserted through one of the spaces between the arms 13 and 14 and may be arranged as shown in Fig. 3, with one of its ears, for example the ear 12, seated in the bottom of the groove 16, and with the gland inclined. By proper angular movement of the gland, the ear 11 may now be moved up through the opening 18 in flange 17 to a point above the flange, and then by lateral movement of the gland, the ear 11 is caused to overlap the flange 17. The stem 4 is now passed up through the gland 10 and its screw-threaded portion is engaged with the sleeve 21 in the upper end 5 of the bonnet. When thus arranged, the stem prevents lateral movement of the gland with respect to the nut 15, so that the gland can not be moved laterally, and thereby disassembled from the nut. The bonnet is now assembled with the valve body, and after the packing has been placed in the recess designed for it, the nut 15 is screwed down, pushing the gland down and thereby compressing the packing. If at any time it should be desired to remove the packing for replacement or otherwise, it is only necessary to retract the nut 15, since the flange 17, by engagement with the ears 11 and 12, positively lifts the gland and withdraws it from the packing recess. Thus the mere application of a wrench to the nut 15 suffices to withdraw the gland and expose the packing for inspection, removal, or adjustment.

It will be noted by reference to Fig. 2, that the members 13 and 14 occupy but a small part of the circumferential dimension of the bonnet, thus leaving large open spaces for the circulation of air about the upper end of the gland so that the latter is free to radiate heat and the packing is not unduly heated.

In Figs. 4 and 5, a modified arrangement is shown in which the nut 15$^a$ is provided with the internal groove 16$^x$ corresponding with the groove 16 above described, but in this case the groove is of substantially the same diameter or but slightly greater than the distance between the ends of the ears 11 and 12 of the gland. In order to permit assembly of the parts, a lateral recess or opening 19$^a$ is arranged to extend radially out from the groove 16$^a$ at one side, and in assembling the parts one of the ears of the gland is pushed into or through this recess or opening to permit the other ear to be swung up above the flange 17$^a$ and into the groove. When the stem is assembled with these parts, the gland is held centered in operative position.

In Fig. 6, another arrangement is shown in which the nut 15$^b$ is furnished with an internal groove 16$^b$ which in this case is of substantial depth in an axial direction. The gland 10$^b$ is furnished with the ears 11$^b$ and 12$^b$, and in assembling the parts the gland is disposed angularly for insertion up into the nut and tipped far enough so that the ears 11$^b$ and 12$^b$ may be received within the depth of the groove 16$^b$, whereupon the gland is turned until the ears lie in a plane perpendicular to the axis of the nut. In this case the groove 16$^b$ need not be of a diameter substantially greater than the distance between the ends of the two ears. While this arrangement may be used, that shown in Fig. 1 is preferred, since it provides a greater thickness of nut for the reception of the screw threads than is possible with the arrangement of Fig. 6.

While the flange 17 or 17ª is shown as integral with the nut, it is to be understood that it may be formed as an independent part and fixedly secured to the nut in any desired manner, and when the nut is described as of integral or one-piece construction, this expression is to be understood as inclusive of any arrangement in which its various parts are permanently united together.

In considering the mode of assembly of the gland with the nut, it will be noted that in each case above described, the movement of the gland relative to the nut comprises both an angular and a lateral component of motion, and that by the construction described it is possible thus to assemble a one-piece nut with a gland so that the gland is constrained to partake of the axial movement of the nut in either direction, and while in association with the valve stem can not be separated from the nut.

It is further to be understood that changes in size, proportion of parts, and details of construction, as well as the substitution of equivalents, fall within the scope of the invention.

We claim:

1. A valve having an actuating stem and means for packing the stem including a gland, a one-piece nut for advancing and retracting the gland, the nut and gland being capable of assembly and separation by relative movement comprising a lateral component, the stem when assembled with the gland preventing such lateral component of movement.

2. A valve having an actuating stem and means for packing the stem including a gland, a one-piece nut for advancing and retracting the gland, the nut and gland having interengaging elements for transmitting movement of the nut to the gland, the nut and gland being so constructed and arranged as to permit their assembly or separation by relative movement comprising a lateral component, the stem when assembled with the gland preventing such lateral component of movement.

3. A valve having an actuating stem and means for packing the stem including a gland, a nut for advancing and retracting the gland, the nut having an internal groove and the gland having projecting lugs, the groove and lugs being of such relative dimensions as to permit assembly or separation of the nut and gland by relative movement comprising a lateral component, the stem when assembled with the gland preventing such lateral component of movement.

4. A valve of the kind having a body provided with a valve seat, a valve head cooperable with the seat, a stem for moving the head, a bonnet surrounding the stem, the bonnet having a packing recess concentric with the stem, said valve comprising a gland telescoping over the stem, said gland having laterally extending diametrically opposed actuating ears, and a one-piece adjusting nut having screw-threaded engagement with the bonnet and having an internal circumferential groove in which the ears of the gland are seated, the internal diameter of said groove being substantially greater than the maximum distance between the outer edges of the ears of the gland and the depth of the groove being such as to permit assembly or separation of the nut and gland by relative movement comprising a lateral component, the stem when assembled with the gland preventing such lateral component of movement.

5. A valve of the kind having a body provided with a valve seat, a valve head cooperable with the seat, a stem for moving the head, a bonnet surrounding the stem, the bonnet having a packing recess concentric with the stem, said valve comprising an adjusting nut having screw-threaded engagement with the bonnet, said nut having an internal circumferential groove, a gland coaxial with the stem, said gland having oppositely extending actuating ears normally seated in the groove in the nut, the length of the ears and the depth and diameter of the groove being such as to permit assembly or separation of the nut and gland by relative movement comprising a lateral component, the stem when assembled with the gland preventing such lateral component of movement.

6. A valve of the kind having a body provided with a valve seat, a valve head cooperable with the seat, a stem for moving the head, a bonnet surrounding the stem, the bonnet having a packing recess concentric with the stem, said valve comprising an adjusting nut having an internal groove and a radially extending recess, the outer wall of said groove consisting of an annular flange integral with the nut, a packing gland having outwardly extending ears, the distance between the remote edges of the ears being such as to permit assemblage of the gland and nut by first inserting one ear in the groove and recess and then by successive angular and lateral movements of the gland causing the other ear to enter the groove, the subsequent assembly of the stem with the gland holding the parts in concentric relation and preventing separation of the gland and nut.

7. A valve of the kind having a body provided with a valve seat, a valve head cooperable with the seat, a stem for moving the head, a bonnet surrounding the stem, the bonnet having a packing recess concentric with the stem, said valve having a bonnet comprising spaced parallel connecting arms having screw-threaded outer surfaces, a one-piece nut engaging said threaded surfaces, said nut having an internal circumferential groove, and a packing gland having integral ears projecting into said groove, whereby the gland is constrained to partake of axial movement of the nut, the arms of the bonnet being so spaced as to permit free circulation of air for contact with the exposed end of the gland, and the length of the ears and the depth of the groove being such as to permit assembly or separation of the nut and gland by relative movement comprising a lateral component, the stem when assembled with the gland preventing such lateral component of movement.

8. A valve of the kind having a body provided with a valve seat, a valve head cooperable with the seat, a stem for moving the head, a bonnet surrounding the stem, the bonnet having a packing recess concentric with the stem, said valve comprising a one-piece adjusting nut having screw-threaded engagement with the bonnet, said nut having an interal circumferential groove, a gland normally coaxial with and fitting snugly about the stem, said gland having lateral ears normally seated in the groove in the nut, the nut having a radial flange constituting one wall of the groove, the diameter of the opening in the flange being less than the distance between the outer edges of the ears of the gland, the depth of the groove being substantially greater than the thickness of the ears and the maximum diameter of the groove being greater than said distance, whereby when the gland is concentric with the nut it is united to the latter, but when eccentric to the nut its ears may be disengaged successively from behind the radial flange.

9. A valve of the kind having a body provided with a valve seat, a valve head cooperable with the seat, a stem for moving the head, a bonnet surrounding the stem, the bonnet having a packing recess concentric with the stem, said valve comprising an adjusting nut having an internal circumferential groove, the end wall of which consists of an annular flange fast to the nut, a packing gland having diametrically extending ears, the distance between the remote edges of the ears being greater than the opening in said flange and but slightly less than the diameter of the circumferential wall of the groove, the nut having a radial recess leading from the groove into which one ear of the gland may be inserted in assembling the parts, whereupon by successive angular and radial movements of the gland the other ear may be introduced into the groove, the subsequent assembly of the stem with the gland preventing relative radial movement of the nut and gland such as would permit their separation.

10. A valve of the kind having a body provided with a valve seat, a valve head cooperable with the seat, a stem for moving the head, a bonnet surrounding the stem, the bonnet having a packing recess concentric with the stem, said valve comprising an adjusting nut having an internal circumferential groove and a radial recess leading therefrom, the end wall of the groove consisting of an annular flange fast to the nut, a packing gland having diametrically extending ears, the distance between the remote edges of the ears being greater than the opening in said flange and but slightly less than the diameter of the circumferential wall of the groove, the axial depth of the groove being such that in assembling the parts the gland may be rocked angularly until its ears may be inserted within the groove, whereupon upon subsequent angular movement of the gland the ears may be brought into a plane perpendicular to the axis of the nut, the subsequent assembly of the stem with the gland preventing such relative movement of the nut and gland as to permit separation of the latter parts.

Signed by us at Boston, Massachusetts this twenty-sixth day of June, 1931.

HARRISON E. EVANS.
CHAUNCEY D. ALLEN.